UNITED STATES PATENT OFFICE.

GILBERT THOMAS MORGAN, OF LONDON, ENGLAND, ASSIGNOR TO LEVINSTEIN LIMITED, OF MANCHESTER, ENGLAND, A BRITISH CORPORATION.

ALKYLARYLAMIN PRODUCTION.

1,221,077.  Specification of Letters Patent.  Patented Apr. 3, 1917.

No Drawing.  Application filed June 1, 1916. Serial No. 101,037.

*To all whom it may concern:*

Be it known that I, GILBERT THOMAS MORGAN, a subject of Great Britain, residing at 13 Elms avenue, Muswell Hill, London, N., in the county of Middlesex, England, have invented certain new and useful Improvements in Alkylarylamin Production, of which the following is a specification.

This invention relates to processes for the production of alkylarylamins (monoalkylated aromatic amins), such, for example, as methylanilin.

It has heretofore been proposed to produce metylanilin by reduction in the presence of caustic soda of the condensation product obtained from formaldehyde and anilin, this procedure involving two separate operations, to wit: allowing the mixture of formaldehyde and anilin to warm spontaneously by the heat of combination in the presence of caustic soda, and subsequently treating the product of this condensation by a reducing agent. With such procedure, however, the process was only of scientific and not of industrial value, by reason of the unsatisfactory yield due to the presence in the condensation product of polymerized methyleneanilin and of methylene diamino diphenyl.

I have found that by bringing together in a suitable medium and in the presence of a suitable reducing agent, a primary aromatic amin, such as anilin, napthylamin or their homologues and derivatives other than their nitro-compounds, an aliphatic aldehyde, such as formaldehyde or its homologues, and by heating the same, the possibility of polymerization is reduced to a minimum and the yield of alkylarylamins is vastly increased, while the process is at the same time simplified. The following is an example of a process embodying my invention:

Anilin (60 parts) and the formaldehyde solution (66 parts of 40% solution of formaldehyde) are added slowly and concurrently to 300 parts of water and 200 parts of caustic soda solution (34% NaOH=sp. gr. 1.37) containing in suspension 90 parts of zinc dust. The mixture is heated to about 90° centigrade and kept thoroughly stirred throughout the operation. The addition of aldehyde and amin takes about two hours and the stirring and heating are continued for about six hours longer. During the second period a further 40 parts of the formaldehyde solution are slowly added. Samples of the oil are removed from time to time and tested for methylanilin until the proportion of this secondary amin reaches a maximum. The whole mixture is then distilled in steam and the methylanilin obtained from the distillate in the usual way.

Instead of using zinc and caustic soda, zinc and ammonium chlorid or other ammonium salts may be used as a reducing agent, or I may employ sodium sulfid or polysulfid, sodium sulfite or hyposulfite, sodium phosphite or hypophosphite, sodium stannite, sodium formate, ferrous sulfate alone or with alkali, grape sugar (dextrose) and caustic soda, or any other reducing agent having an alkaline, a neutral or a feebly acidic reaction.

The zinc, if used in connection with caustic soda, may be rendered more active by intimate admixture with a less electropositive metal such as copper in the well-known zinc-copper couple, or it may be partially replaced by aluminium and the latter metal may be similarly made more active by copper as in Devarda's alloy (aluminium, 45 parts, copper, 50 parts, zinc, 5 parts) or by mercury as in aluminium-amalgam. In these circumstances, the caustic soda, when used with zinc, may be replaced by other alkalis, such as caustic or carbonated potash, sodium carbonate or bicarbonate, or by caustic lime, strontia, or baryta, or by hydrated magnesia.

As a convenient medium in which to effect the reaction I may employ water, dilute or concentrated acetic acid or its homologues, or any liquid in which the aromatic amin may be soluble, providing that this liquid is either neutral or alkaline or is devoid of a strongly acidic reaction such as is acetic acid above indicated. The degree of acidity admissible will vary in different cases and it can be easily ascertained by a simple test. It must never be of such a character as to inhibit the formation of the anhydro-base.

I claim:

1. A process of producing alkylarylamins which consists in bringing together in a suitable liquid medium of such a character as not to inhibit the formation of an anhydro-base a reducing agent, a primary aromatic amin and an aliphatic aldehyde, and heating the same.

2. A process of producing alkylarylamins which consists in bringing together in a suitable liquid medium of such a character as not to inhibit the formation of an anhydrobase a reducing agent, anilin and an aliphatic aldehyde, and heating the same.

3. A process of producing methylanilin which consists in bringing together in a suitable liquid medium of such a character as not to inhibit the formation of an anhydrobase a reducing agent, anilin and formaldehyde solution, and heating the same.

4. A process of producing methylanilin which consists in bringing together in a suitable liquid medium of such a character as not to inhibit the formation of an anhydrobase caustic soda, zinc dust, anilin and formaldehyde solution, and heating the same.

5. A process of producing methylanilin which consists in bringing together in water caustic soda, zinc dust, anilin and formaldehyde solution, and heating the same.

In testimony whereof I have affixed my signature.

GILBERT THOMAS MORGAN.

Witnesses:
C. S. ELLIS,
WM. PARKINSON.